United States Patent
Barbur et al.

(10) Patent No.: US 6,353,802 B1
(45) Date of Patent: Mar. 5, 2002

(54) REJECT ANALYSIS

(75) Inventors: Vicki Ann Barbur, Berkhamsted; Andrew Green, Harrow, both of (GB)

(73) Assignee: Eastman Kodak Company, Rochester, NY (US)

( * ) Notice: Subject to any disclaimer, the term of this patent is extended or adjusted under 35 U.S.C. 154(b) by 866 days.

(21) Appl. No.: 08/614,459

(22) Filed: Mar. 12, 1996

(30) Foreign Application Priority Data

Jul. 25, 1995 (GB) .............................................. 9515274

(51) Int. Cl.$^7$ .............................................. G05B 13/02
(52) U.S. Cl. .......................... 702/84; 702/81; 700/108; 700/109
(58) Field of Search ................................. 364/552, 554, 364/468.15, 468.16, 468.17, 551.01, 550, 498; 702/81, 82, 83, 84; 700/108, 109

(56) References Cited

U.S. PATENT DOCUMENTS

| | | | | |
|---|---|---|---|---|
| 5,121,337 A | * | 6/1992 | Brown | 364/498 |
| 5,406,502 A | * | 4/1995 | Haramaty et al. | 364/551.01 |
| 5,442,562 A | * | 8/1995 | Hopkins et al. | 364/468.15 |
| 5,446,681 A | * | 8/1995 | Gethner et al. | 364/554 |
| 5,592,402 A | * | 1/1997 | Beebe et al. | 364/498 |

OTHER PUBLICATIONS

Martin et al., "Process Performance Monitoring Using Multivariate Statistical Process Control", IEE Proceedings on Control Theory and Applications, vol. 143, No. 2, Mar. 1996, pp. 132–144.*

Babiloni et al., "Statistical Analysis of Topographic Maps of Short–Latency Somatosensory Evoked Potentials in Normal and Parkinsonian Subjects", IEEE Trans. on Biomedical Engineering, vol. 41, No. 7, Jul. 1994, pp. 617–624.*

Chee K. Chow, "Projection of Circuit Performance Distributions by Multivariate Statistics", IEEE Trans. on Semiconductor Manufacturing, vol. 2, No. 2, May 1989, pp. 60–65.*

Ignova et al., "Neural Networks and Nonlinear SPC", Proceedings of the Third IEEE Conference on Control Applications, Aug. 1994, pp. 1271–1276.*

Piovoso et al., "Process Data Chemometrics", IEEE Instrumentation and Measurement Technology Conference, May 1991, pp. 608–612A.*

Efthimaidu et al., "Online Statistical Process Control of Chemical Processes", International Conference on Control, Mar. 1991, pp. 700–705.*

H. Hotelling, The Annals of Mathematical Statistics, *The Generalization of Student's Ratio*, 1931, vol. 2, pp. 360–378.

D.C. Montgomery, Introduction to Statistical Process Control, Wiley, 1991, pp. 109–127.

G.W. Snedecor and W.G. Cochran, Statistical Methods, 1980, 7th Ed., Iowa State University Press, pp. 220–223.

P. Miller, R.E. Swanson and C.F. Heckler, Contribution Plots: The Missing Link in Multivariate Quality Control, 37th Annual Fall Conference, 1993, ASQC, Rochester, New York, USA.

* cited by examiner

*Primary Examiner*—Eric B. Stamber
(74) *Attorney, Agent, or Firm*—Thomas H. Close

(57) ABSTRACT

Described herein is a method for reject analysis for use in any process where rejects occur. The method comprises using the application of multivariate statistical process control techniques, and allows the rejects from a process to be controlled in a simple and effective manner by deriving the $T^2$ statistic for a series of variables or classification categories that impact reject performance characteristics. The calculated $T^2$ value is compared with a standard value for the particular system. If the value exceeds the critical value, it suggests that there has been a significant change in the typical reject rate compared with the expected situation and therefore appropriate action can be taken to identify the cause of the change and procedures can be put in place to correct the problems, that is, to return the reject rate to the expected position.

3 Claims, 8 Drawing Sheets

REJECT ANALYSIS

FIELD OF THE INVENTION

The present invention relates to reject analysis.

BACKGROUND OF THE INVENTION

One of the major objectives of reject analysis is to ensure that a process is working within or better than the bounds of its historical capability. Constant monitoring of the rejects from a process is the first step to ensure that procedures, especially new ones, are not having an adverse effect on the overall output.

It is well-known to control a process so that it operates within specified boundaries. This can be achieved using statistical process control (SPC) techniques which involve constant monitoring of the process. Such techniques may be univariate wherein a single variable of the process is monitored or multivariate where more than one variable is monitored. Multivariate SPC techniques are particularly well suited to use with complex processes in which a large number of variables are monitored routinely to assess the status of a particular process. Some of the variables may not be independent and the degree to which they are correlated is often unknown, and such processes cannot be assessed adequately with conventional control techniques.

A single parameter known as Hotelling's $T^2$ (Hotelling, H, (1931), The Generalisation of Student's Ratio, *Ann. Math. Statist.*, 2, pages 360–378) can be used successfully as an indicator in multivariate SPC techniques to determine the current status of the process. This parameter utilises all the information contained in the monitored variables as well as accounting for any correlation between them. The state of a process is determined by the magnitude of $T^2$, for example, if it exceeds the 95% limit, then the process is behaving in a significantly different way to that of the standard.

The underlying analysis required to deduce the $T^2$ parameter provides a method of quickly identifying causes of process failure. Corrective action guidelines (CAG) can be developed to facilitate the operation of the system and to provide help for common control failure conditions.

Problem to be Solved by the Invention

Previously known procedures for reject analysis were effectively based on univariate statistical process control (SPC) techniques. However, these techniques are not suitable for use with complex processes where, for each process, a large number of variables are routinely monitored to assess the status of that process. Some of the variables in such a process may not be independent and the degree to which the variables are correlated is often unknown, making it difficult to assess the status of the process.

SUMMARY OF THE INVENTION

It is therefore an object of the present invention to implement multivariate statistical process control (SPC) techniques for reject analysis in order to overcome the problems mentioned above.

In accordance with one aspect of the present invention, there is provided a method of carrying out reject analysis on a repetitive process, the method comprising the steps of:

a) defining a set of variables for the process;

b) sampling data relating to rejects obtained from the process for the defined set of variables;

c) defining a model of the process from the sampled data;

d) applying limits to the model indicative of out-of-control conditions;

e) monitoring the process for out-of-control situations; and f) taking corrective action to bring the process back into control when the applied limits have been exceeded;

characterised in that the model is defined using principal component analysis in terms of parameters $T^2$ and $Q_{res}$, where $T^2$ is derived from the sum of the squares of the scores of each of the principal components of the model and $Q_{res}$ is derived from a weighted sum of the squares of the scores of the principal components not included in the model.

If the $T^2$ parameter exceeds a predetermined limit, the contribution of the scores to that $T^2$ parameter value is interrogated to determine which score is the primary contributor. The score which forms the primary contributor is interrogated further to assess which of the monitored variables is of significance.

An additional parameter $Q_{res}$ may also be determined for the process. If either of the $T^2$ or $Q_{res}$ parameters exceeds predetermined limits, then it indicates a significant change compared with the reference system.

$T^2$ and $Q_{res}$ monitor different out-of-control behaviour, $T^2$ assessing systematic variability within the model and $Q_{res}$ the systematic non-random variability not captured by the model.

The term 'repetitive process' means a routine process which is repeated according to requirement for that process. For example, processing of X-ray films in a radiology department is a routine process which is repeated as required.

Advantageous Effect of the Invention

By using multivariate SPC techniques, the sensitivity of detecting out-of-control conditions for reject analysis is increased in comparison with existing manual and labour intensive methods.

In accordance with the present invention, the method of reject analysis described herein provides a key parameter on which to base a quality assurance strategy. As a result, the method is also applicable in other applications, for example, photofinishing.

It also provides a sound statistical foundation on which to formulate any quality improvement strategy, and a simple parameter is derived for used in everyday operations.

A potential benefit of using Hotelling's $T^2$ parameter is that it additionally yields vital information which can be used to correct any control failure problem with efficacy.

In particular $T^2$ determines, the aim and limits for rejects from a process in terms of monitored variables or classification categories. An immediate assessment of any analysis period relative to a reference position can be determined. Moreover, the method also allows the causes of increased or decreased reject rates to be quickly established and then measures, can be implemented either to correct problems or new algorithms generated to reflect the improved working position.

Furthermore, the use of the method of the present invention ensures that other measured variables or categories found to impact the reject performance characteristics of a process at a later stage can be included as an extension to that method at any time.

BRIEF DESCRIPTION OF THE DRAWINGS

For a better understanding of the present invention, reference will now be made, by way of example only, to the accompanying drawings in which.

DETAILED DESCRIPTION OF THE INVENTION

The operation of the method in accordance with the present invention will be described with reference to a hospital radiology department where X-ray films are often rejected due to errors in patient positioning, over- and under-exposure, etc. However, it will be readily appreciated that reject analysis is applicable to any other process where reject analysis is required.

Figure 1:
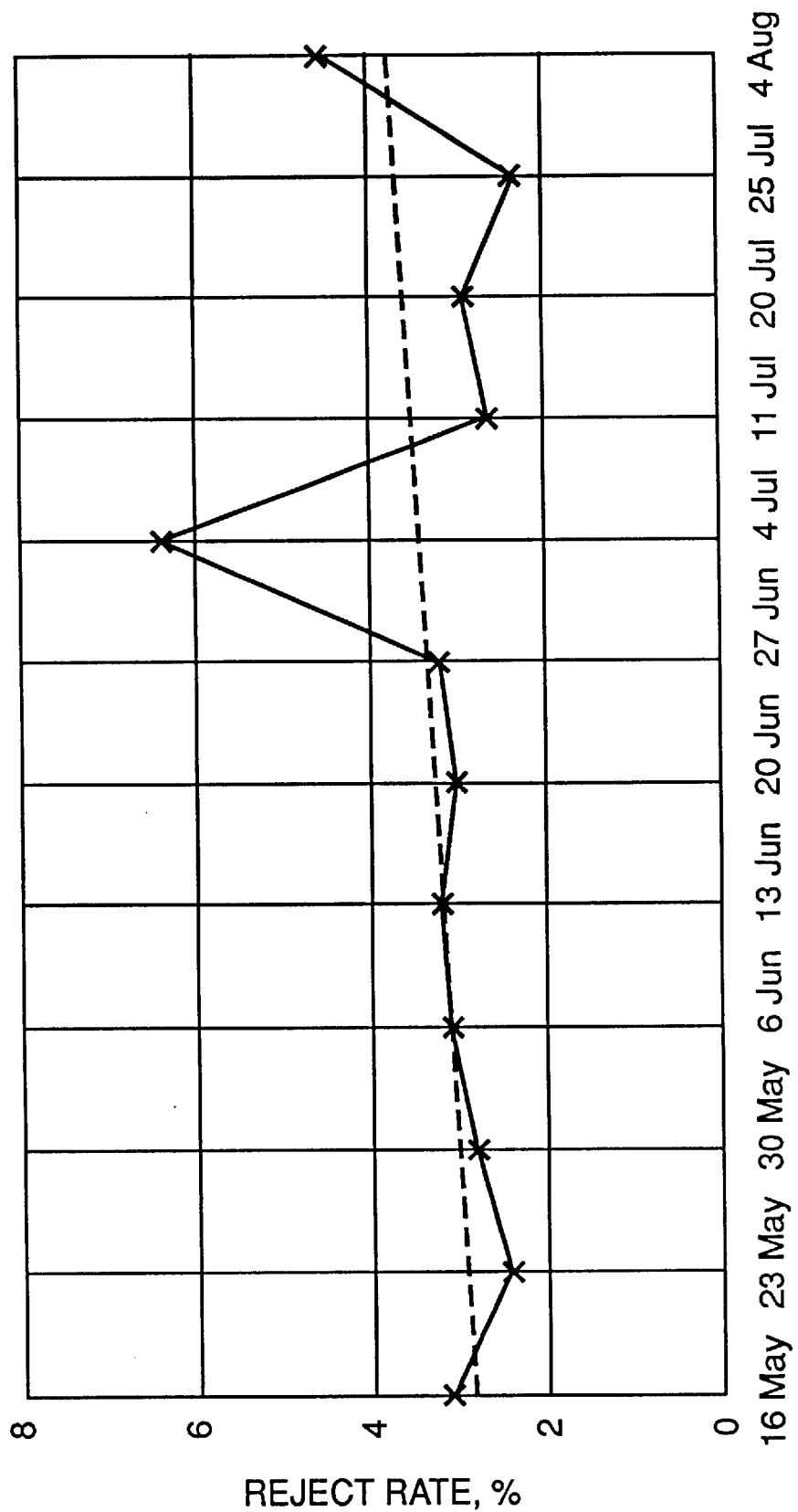
FIG. 1 is a graph showing a typical reject rate expressed as a percentage caused by incorrect patient positioning in a radiology department.
Figure 2:
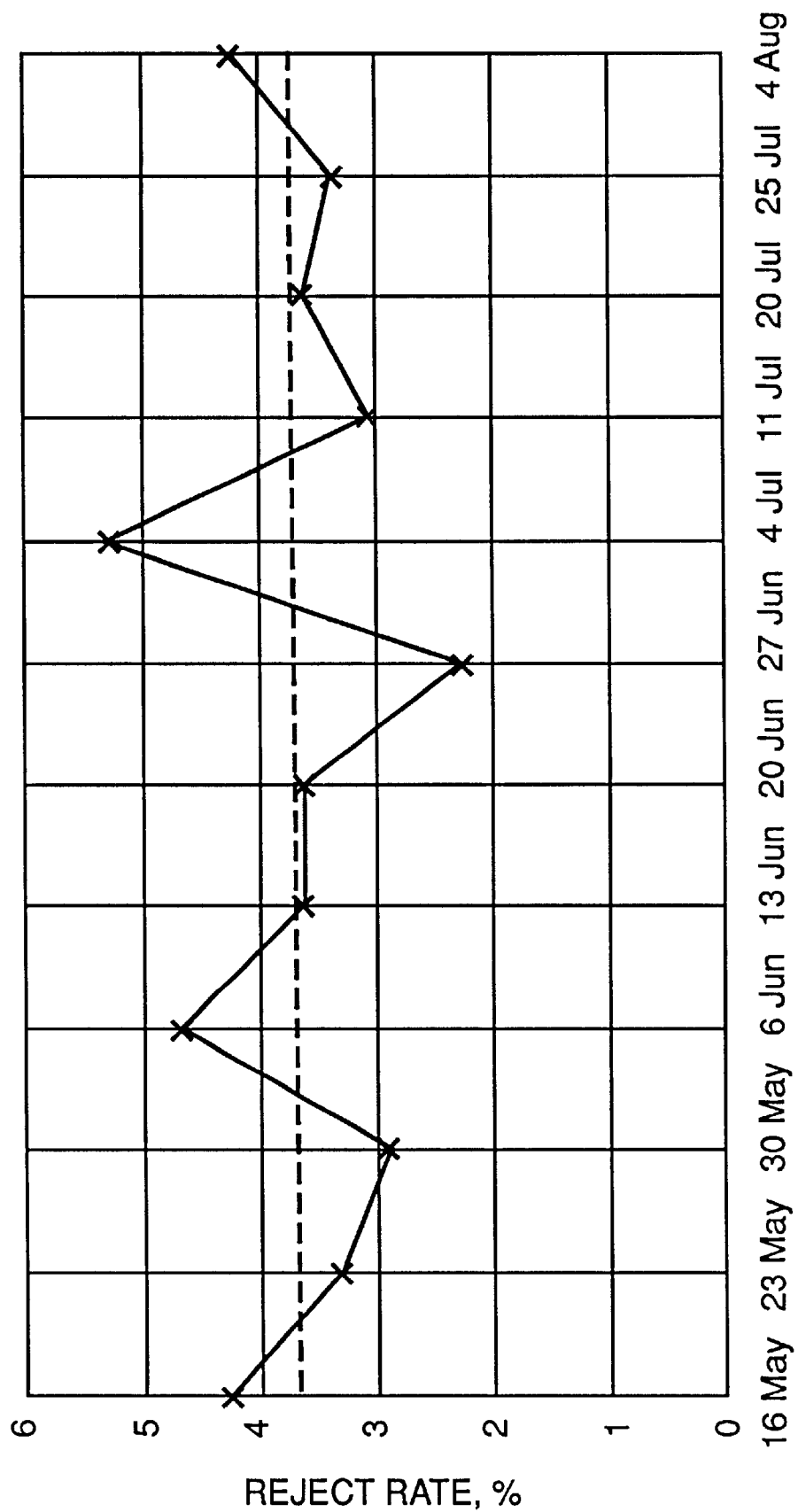
FIG. 2 is similar to FIG. 1 but for rejects caused as a result of over-exposure.

The result of a typical reject analysis study can be illustrated in a series of graphs or charts which show the percentage rejects in each category, for example, patient positioning, over-exposure, under-exposure, etc. for a particular radiology department over a period of time. Examples of the kinds of graphs routinely produced with a reject analysis system are shown in FIGS. 1 and 2. In FIG. 1, rejects are obtained due to incorrect patient positioning. The abscissa shows the date of each study and the ordinate percentage reject rate. Similarly, FIG. 2 shows the rejects obtained due to over-exposure, the abscissa and ordinate being the same as for FIG. 1. Rejects due to other variables of the process are also monitored but are not illustrated here.

The charts, shown in FIGS. 1 and 2, produced from a typical study are therefore effectively statistical process control (SPC) charts for each reject category. This allows standard univariate SPC rules to be applied. These rules are described in detail in *Introduction to Statistical Process Control*, D C Montgomery, Wiley, 1991.

However, when there are several charts to assess in the case of radiology rejects, some twenty-eight reject categories in total, the use of a series of univariate charts becomes ineffective and inefficient.

In accordance with the present invention, this problem is overcome by using principal component analysis (PCA) techniques with the data collected from the reject analysis study.

A PCA model of the system, that is, the operation of a radiology department, is set up which is based on a set of data which is known to represent controlled conditions in the radiology process. In the particular to be described, data for twenty weeks was used to develop the model and five additional sets of data were used as a test of the ability of the model to detect out-of-control situations. Any final model used in a radiology department may be the result of several iterations and optimizations in view of the aims and objectives in respect of reject rates for a particular radiology department. The overall result of the process would be to maintain or decrease the reject rates within clearly defined limits and to swiftly establish the cause of any out-of-control situations—especially those which raise the reject rate and expose both staff and patients to greater risk by exposure to increased levels of radioactivity.

PCA produces a set of components which are derived from a linear transformation of the original variables which have been standardised, that is, they have a mean of zero and a variance of one. In this way, all the variables have equal weight in the analysis. The most important feature of the new components is that they are independent and orthogonal to each other. A sufficient number of the new components are extracted so as to form a model which accounts for a significant amount of variability in the original data for a reference process or system. In this way, the dimensionality of the problem is reduced and is more apparent the larger the number of variables which are consistently monitored in the process.

In a particular example, sixteen reject classifications can be represented by a PCA model with only eight principal components which accounts for 89% of the variability in the original data set. Table I illustrates the sixteen reject classifications for this example.

TABLE I

| VARIABLE NUMBER | REJECT CLASSIFICATION |
| --- | --- |
| 1 | Poor coverage |
| 2 | Patient moved |
| 3 | Patient positioning |
| 4 | Gross artifact |
| 5 | Cassette position |
| 6 | Under-exposure |
| 7 | Over-exposure |
| 8 | Incorrect film/cassette combination |
| 9 | Equipment fault |
| 10 | Clear with patient ID |
| 11 | Film jamming |
| 12 | QC films |
| 13 | Black film |
| 14 | Clear film |
| 15 | Green film |
| 16 | Miscellaneous |

Figure 4:
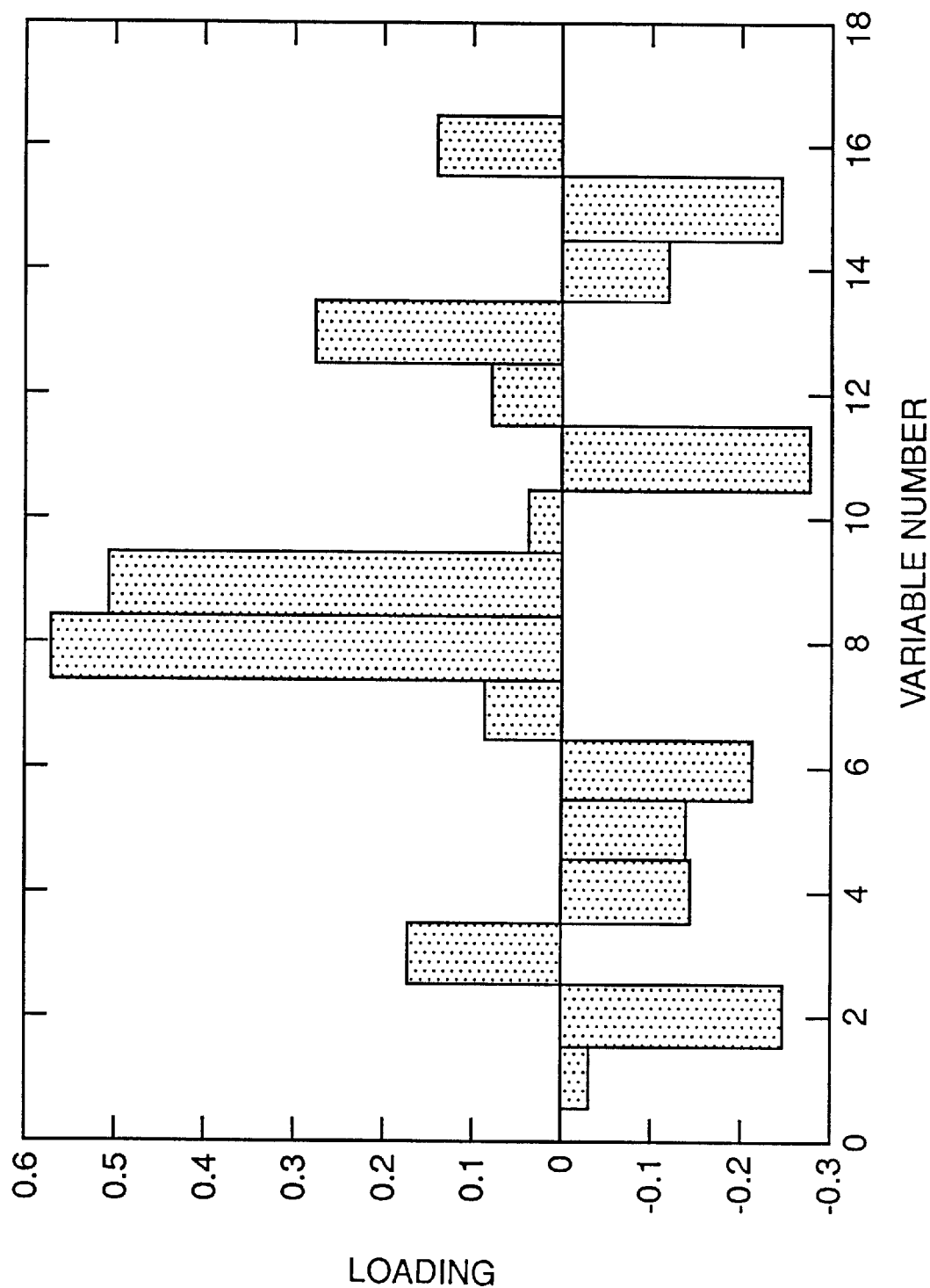
FIG. 4 is similar to FIG. 3, but for the second principal component.
Figure 5:
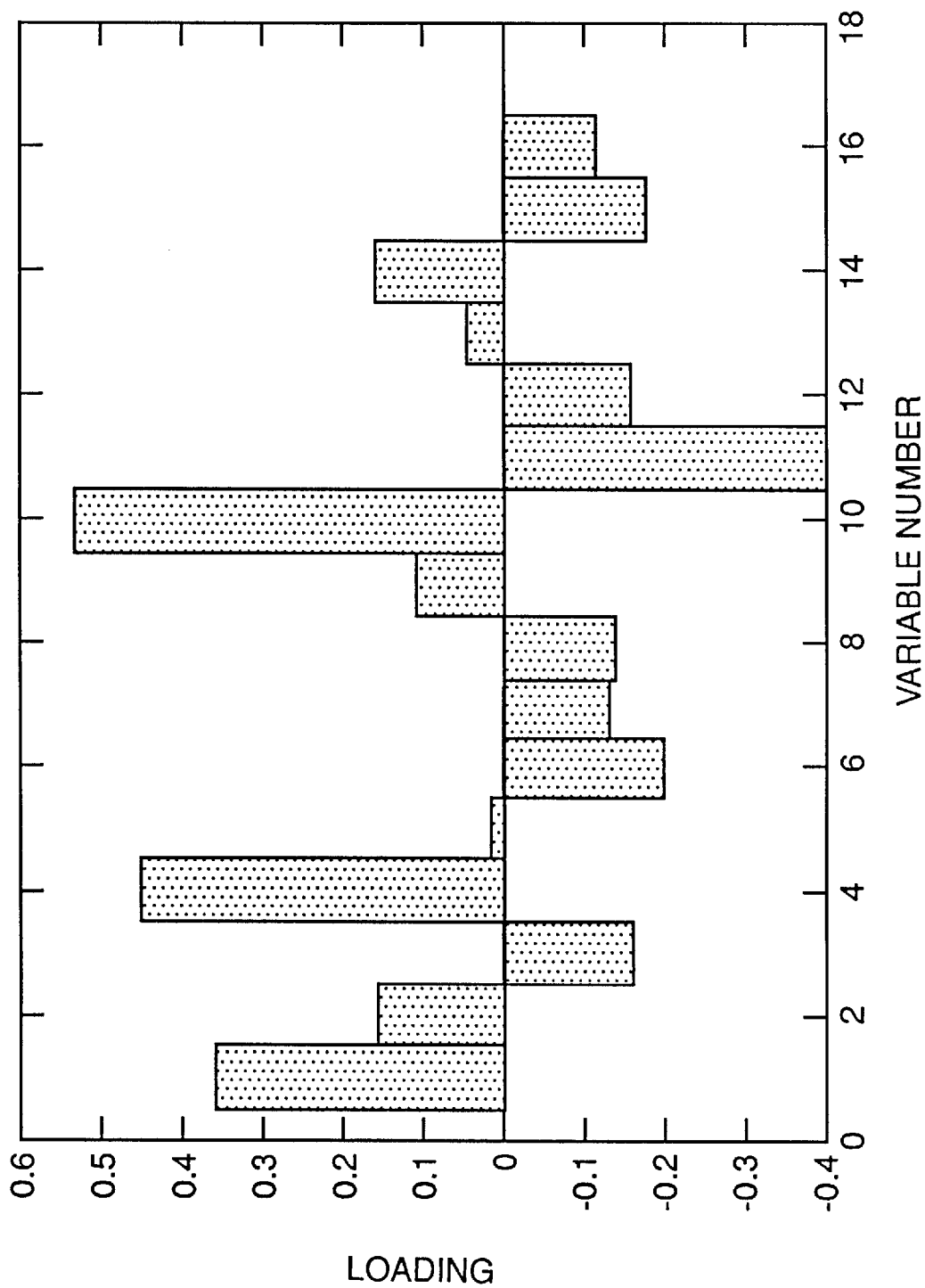
FIG. 5 is similar to FIG. 3, but for the third principal component.

Each principal component consists of a series of loadings which weight the initial classifications in terms of their contribution to the variability of the model. The contributions can be assessed subjectively to ascribe and to identify the new components. The loadings of the first three principal components are shown in FIG. 3, FIG. 4 and FIG. 5 respectively.

Figure 3:
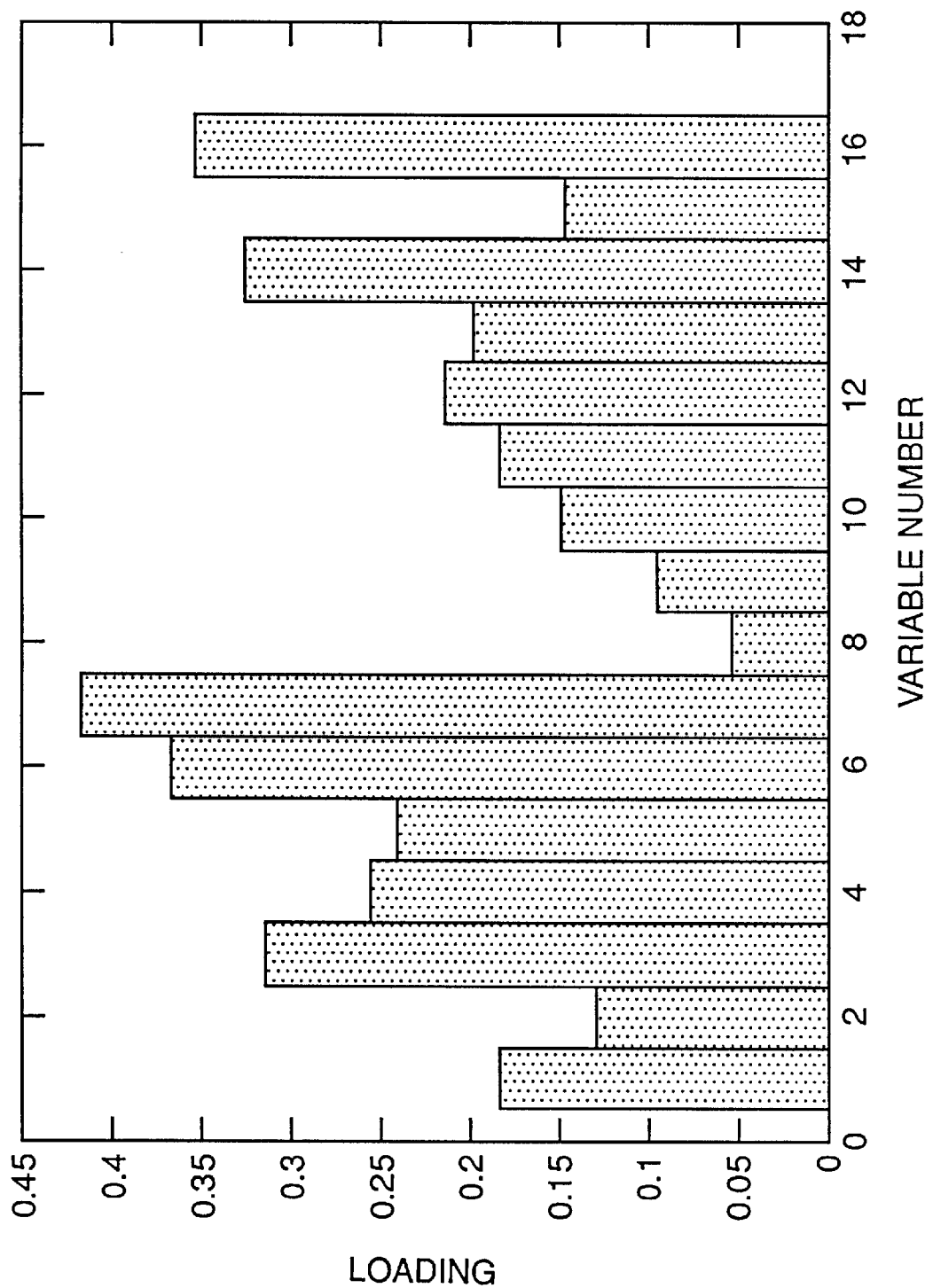
FIG. 3 illustrates loading for the first principal component in accordance with variable number.

It can be seen that the classifications of over-exposure and under-exposure, variable numbers 6 and 7 respectively, are weighted heavily in FIG. 3. This principal component relates primarily to exposure conditions. Similarly, in FIG. 4, the second principal component has high weightings for incorrect film/cassette conditions (variable 8) and equipment faults (variable 9). As a result, the second component is identified with rejects due to apparatus/equipment. FIG. 5 shows the weighting given to the third principal component by gross artefact, for example, a watch left on during a session (variable 4), clear with ID (variable 10) and film jamming (variable 11). This third component can be identified with largely miscellaneous items. Other principal components, not described or illustrated, are also utilised.

Hotelling's $T^2$ is then derived from the sum of the squares of the scores of each of the principal components included in the model, for example, when applied to a new set of data that is received from a radiology department. The 95% limit on $T^2$ is determined by the number of components in the model, the size of the original data set and the Fisher F variance ratio test as defined in *Statistical Methods, Seventh Edition*, 1980, G. W. Snedecor & W. G. Cochran, Iowa State University Press.

Hotelling's $T^2$ parameter for two variables, namely, x and y, with means $\bar{x}$ and $\bar{y}$, standard deviations of $s_x$ and $s_y$ and with some correlation indicated by the covariance $s_{xy}$ is given by the equation:

$$T^2 = \frac{s_x^2 s_y^2}{s_x^2 s_y^2 - s_{xy}^2}\left[\frac{(x-\bar{x})^2}{s_x^2} + \frac{(y-\bar{y})^2}{s_y^2} - \frac{2s_{xy}(x-\bar{x})(y-\bar{y})}{s_x^2 s_y^2}\right]$$

and can be easily extended using matrix notation to n dimensions as follows:

$$T^2 = [x-\bar{x}]'S^{-1}[x-\bar{x}]$$

where

S is the covariance matrix

[x-$\bar{x}$] is the matrix of data corrected with respect to the means.

In PCA, $T^2$ is merely the sum of squares of the weighted scores of the principal components included in the model.

An additional parameter, $Q_{res}$, is also calculated. $Q_{res}$ is a weighted sum of the squares of the scores of the principal components not included in the model and is given by:

$$Q_{res} = (x-\hat{x})'(x-\hat{x})$$

where x is the matrix of data; and $\hat{x}$ is the matrix of estimates of x from the model.

The value of $T^2$ and $Q_{res}$ are calculated for any subsequent situation and compared with the 95% limits defined for the system. (Naturally, limits other than 95% can be set in accordance with a particular application.) If either parameter exceeds the limits then there has been a significant change in the overall reject rate which is likely to affect the overall performance of a radiology department.

For example, if the $T^2$ parameter exceeds the 95% limit, the exact reason can be identified quickly by examining the contribution to the scores producing the high value of the $T^2$ parameter. This is described in a paper by P Miller, R E Swanson & C F Heckler entitled *Contribution Plots: The Missing Link in Multivariate Quality Control* presented at the 37th Annual Fall Conference (1993), ASQC, Rochester, N.Y., USA. The highest score is then used to assess which of the monitored variables has resulted in the out-of-control condition (control failure). The, or each, monitored variable found to be producing the out-of-control condition is then adjusted to bring the process back into control in line with the CAGs mentioned above.

In most cases, $T^2$ and $Q_{res}$ exceed limits simultaneously. If $Q_{res}$ alone exceeds the limit then the indication is that the distribution of variability within the process has changed significantly. Then, the model being used is no longer an adequate predictor of the system or process.

Figure 6:
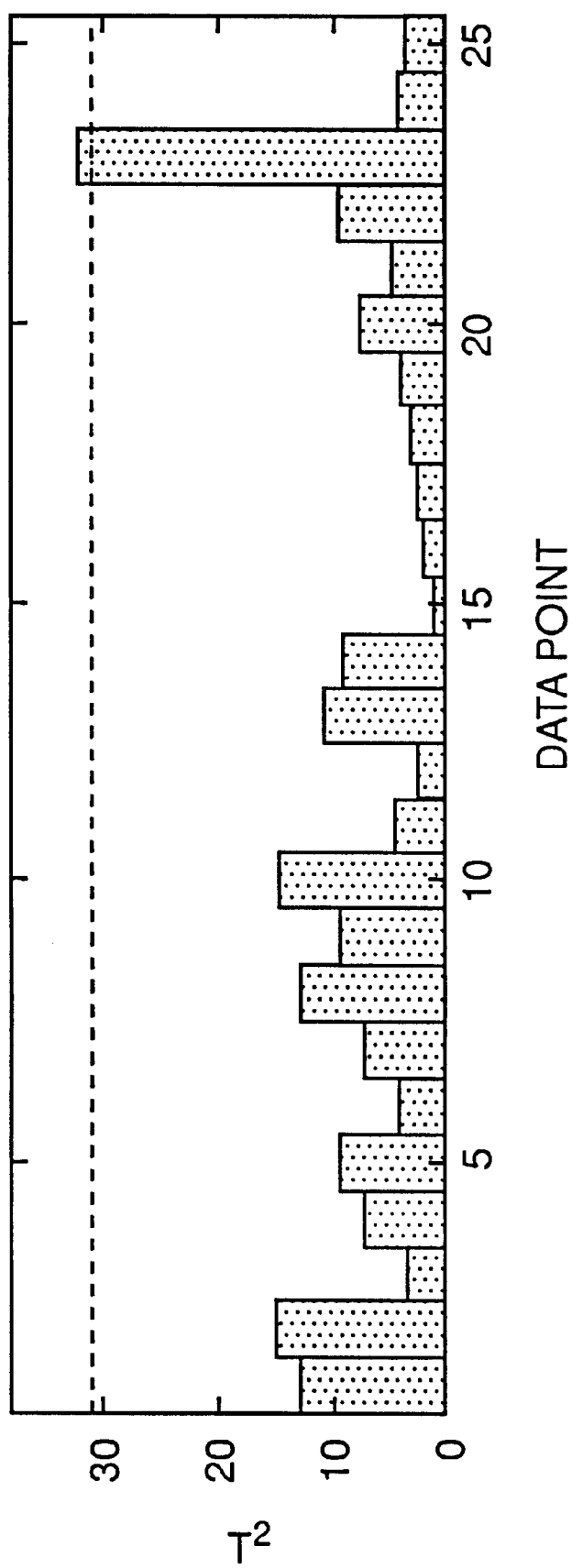
FIG. 6 is a graph of the $T^2$ parameter derived from a principal component analysis (PCA) model for each set of reject analysis data over a given time frame.
Figure 7:
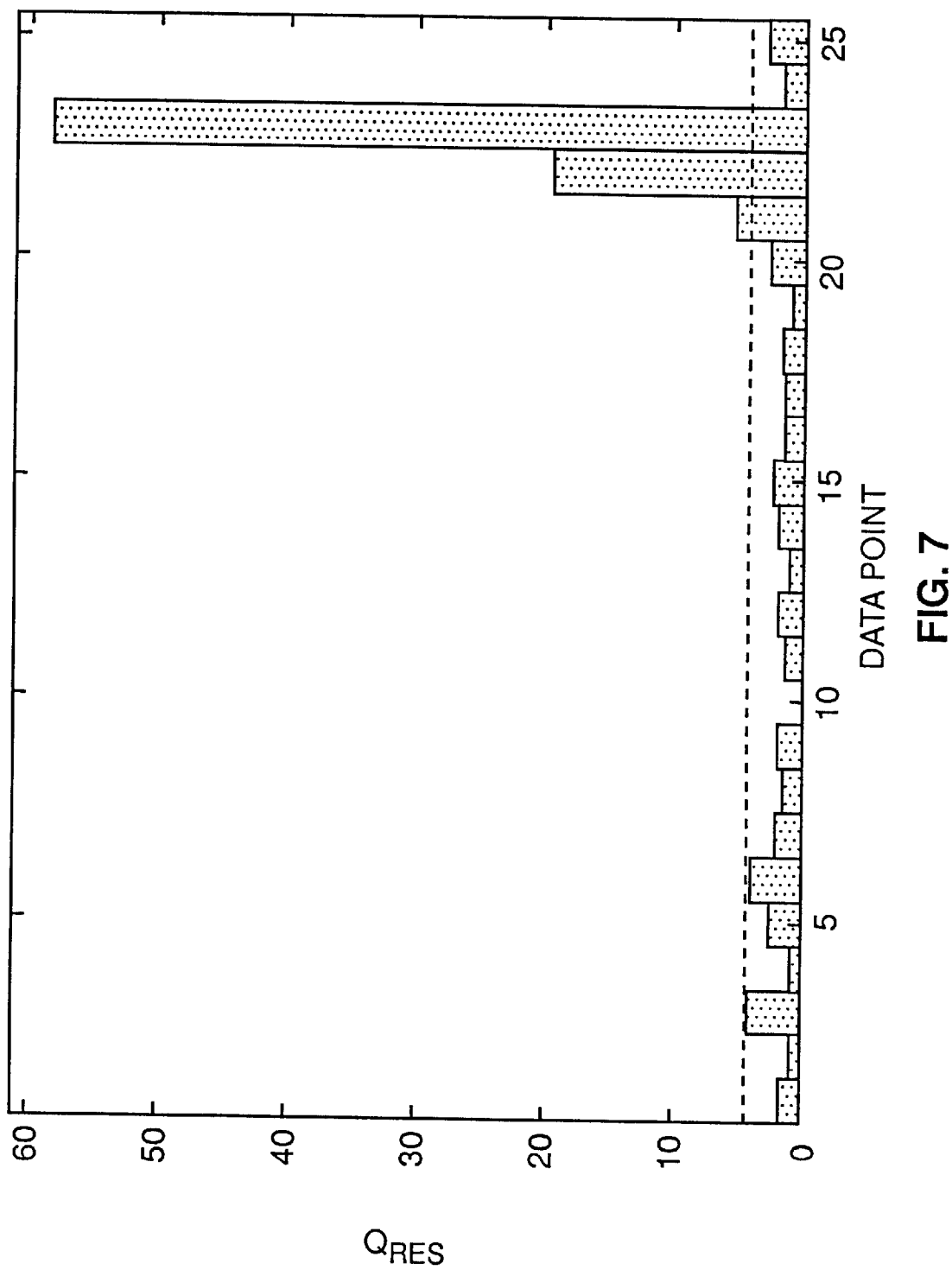
FIG. 7 is a graph of the $Q_{res}$ parameter derived from a principal component analysis (PCA) model for the same set of reject analysis data shown in FIG. 6.

The $T^2$ and $Q_{res}$ charts for the specific example described herein are shown in FIGS. 6 and 7 respectively. In both FIGS. 6 and 7, the horizontal dotted line corresponds to the critical value, that is, the 95% limit. The first 20 data points in each of FIGS. 6 and 7 represents the data on which the PCA model is based. $T^2$ and $Q_{res}$ parameters indicate that the processes are in control with respect to the monitored variables in reject radiographs. The next 5 data points represent a test set which is derived in effect from the same source. They generally show that the system is in good control except for data point 23. In both FIGS. 6 and 7, data point 23 is out-of-control as far as both $T^2$ and $Q_{res}$ are concerned. Data point 22 is also out of control as defined by $Q_{res}$ (FIG. 7). The result for data point 22 indicates that a shift in the distribution of variability amongst the principal components has taken place, whereas the result for data point 23 represents an out-of-control point since both $T^2$ and $Q_{res}$ terms exceed the limits for the system.

Figure 8:
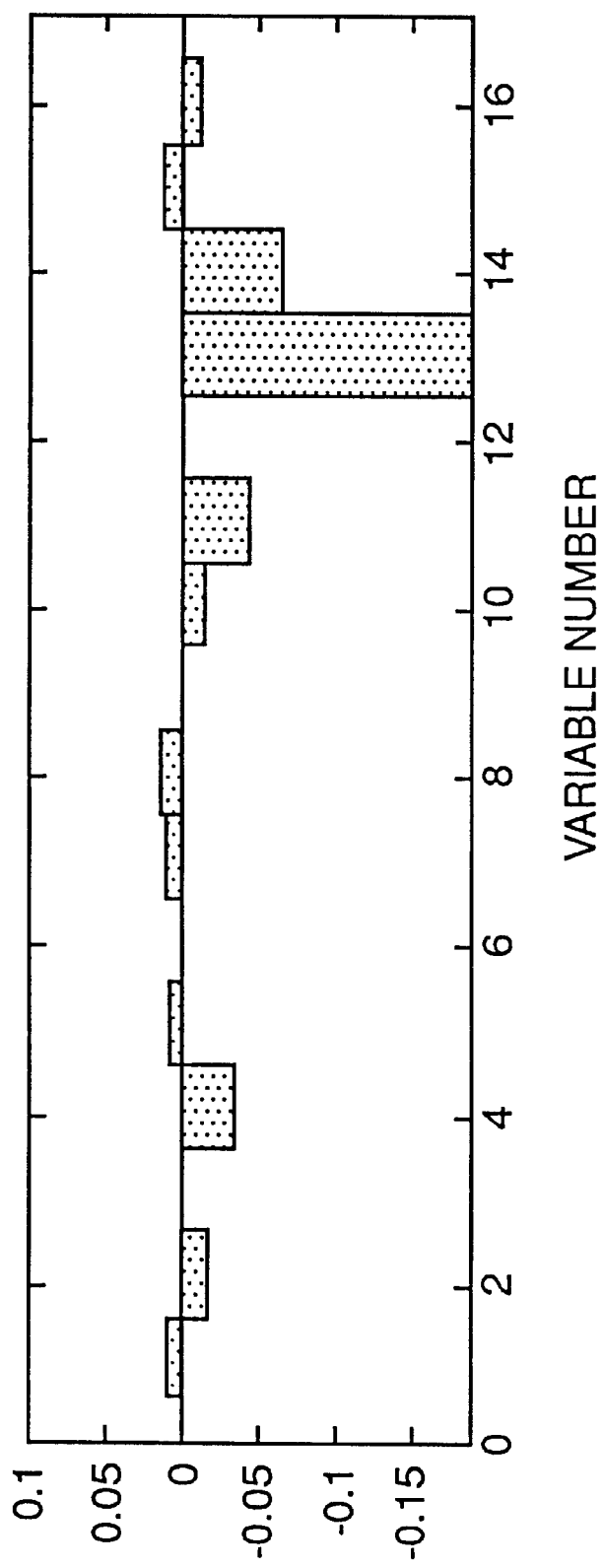
FIG. 8 illustrates the contribution of each classification variable in the first principal component to the high $T^2$ value for the high data points shown in FIGS. 6 and 7.

The contribution of each classification variable in the first principal component to the high $T^2$ value for data point 23 is plotted in FIG. 8. Here, it can be seen that the contribution of variable number 13, that is, black film, has the largest effect. The reject classification defined as black film pinpoints reject radiographs which are processed fogged film. Therefore, by attacking this problem or understanding why it had occurred so frequently on that particular occasion provides a means of controlling the reject rate in a hospital radiology department.

A $T^2$ algorithm for similar data collected routinely in hospital radiology departments allows a $T^2$ statistic to be deduced as a means for controlling the reject rates. This algorithm can easily be used by radiology departments to monitor their reject rates on a routine basis.

The method in accordance with the present invention has greater efficacy and yields results which are superior to those obtained by traditional univariate techniques.

Moreover, reject analysis is achieved by means of the $T^2$ statistic and a series of corrective actions (CAGs) developed to enable swift identification and solutions to problems which increase reject rates.

Although the present invention has been described with reference to a radiology department, the present invention has application in any situation where rejects occur, for example, in a photofinishing laboratory.

Moreover, the present invention has application to any routine process for which a history can be determined as a basis for the reject analysis. It will be understood that this includes batch processes as well as continuous processes.

What is claimed is:

1. A method of carrying out reject analysis on a process, the method comprising the steps of:

a) defining a set of reject classifications for products produced by the process;

b) sampling data relating to rejected products obtained from the process for the defined set of reject classifications;

c) defining a model of the process from the sampled data;

d) applying limits to the model indicative of out-of-control conditions;

e) monitoring the process for out-of-control situations; and f) taking corrective action to bring the process back into control when the applied limits have been exceeded;

characterized in that the model is defined using principal component analysis in terms of the parameters $T^2$ and $Q_{res}$, where $T^2$ is derived from the sum of the squares of the scores of each of the principal components of the model and $Q_{res}$ is derived from a weighted sum of the squares of the scores of the principal components not included in the model.

2. A method according to claim 1, wherein the process is the operation of a radiology department.

3. A method according to claim 1, wherein the process is the operation of a photofinishing laboratory.

* * * * *